United States Patent

[11] 3,608,709

| [72] | Inventor | Brian R. Pike<br>Sylmar, Calif. |
|---|---|---|
| [21] | Appl. No. | 856,099 |
| [22] | Filed | Sept. 8, 1969 |
| [45] | Patented | Sept. 28, 1971 |
| [73] | Assignees | V. Wayne Rogers<br>Pasadena, ;<br>William S. Schneider<br>Glendale; Carl F. Schneider, Peninsula, all of, Calif., part interest to each |

[54] MULTIPLE COMPARTMENT PACKAGE
19 Claims, 10 Drawing Figs.

| [52] | U.S. Cl. | 206/47 A,<br>229/51 WB |
|---|---|---|
| [51] | Int. Cl. | B65d 79/00 |
| [50] | Field of Search | 206/47 A,<br>56 AZ, 84, DIG. 21; 229/51 WB |

[56] References Cited
UNITED STATES PATENTS

| 3,074,544 | 1/1963 | Bollmeier et al. | 206/47 A |
| 3,256,981 | 6/1966 | Kurtz | 229/51 WB |
| 3,294,227 | 12/1966 | Schneider et al. | 206/47 A |
| 3,301,390 | 1/1967 | Via, Jr. | 206/47 A |

Primary Examiner—Joseph R. Leclair
Assistant Examiner—Steven E. Lipman
Attorney—Donald Diamond

ABSTRACT: A multiple-compartment laminated package is provided which is suitable for holding in separate compartments different substances which can be mixed together within the package upon breaking the barrier between the separate compartments. This barrier can be broken by the application of external pressure to the package which applies tension to an inner layer of the outer wall of the package, such rupture of the inner layer taking place at a controlled location by virtue of a reduction in the bond strength between the inner layer and the next adjoining layer of the outer wall of the package.

PATENTED SEP 28 1971 3,608,709
SHEET 1 OF 2
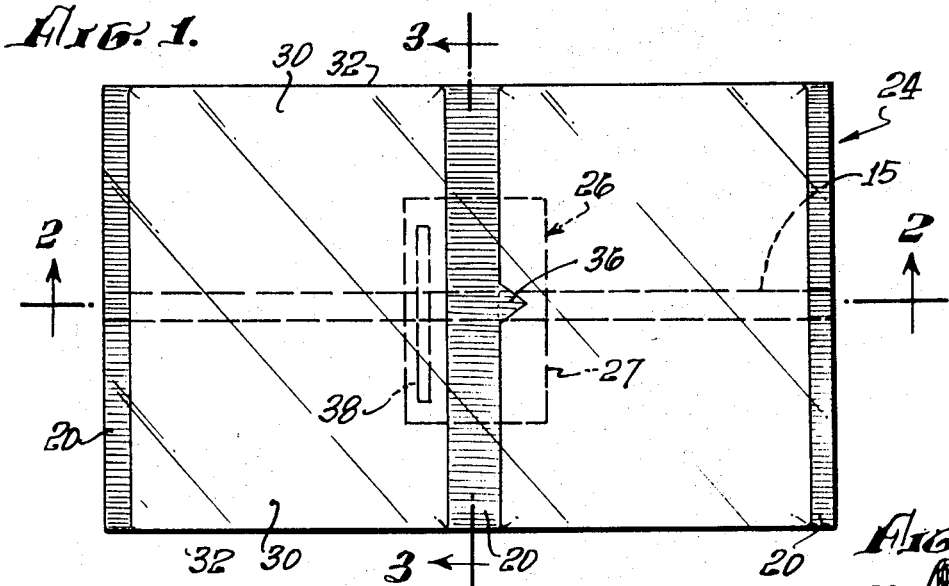
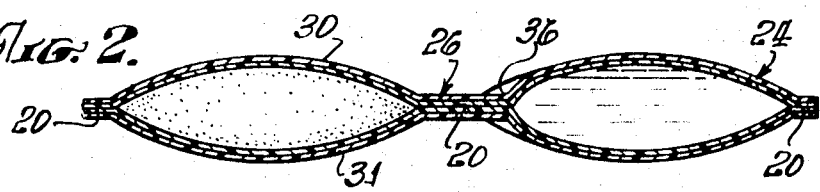
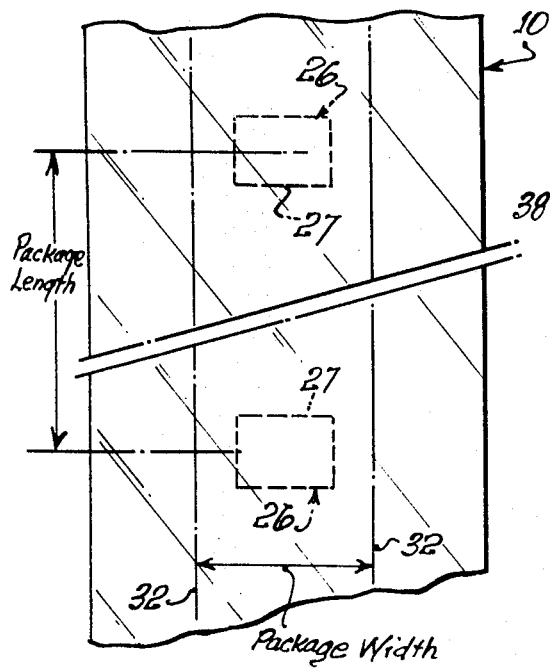
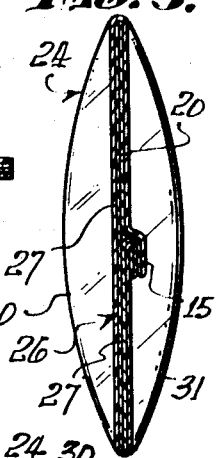
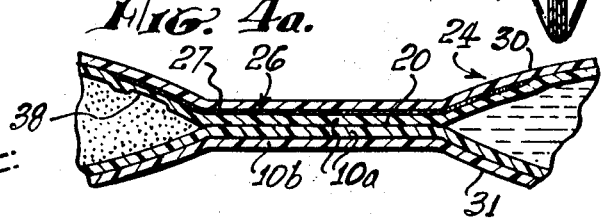
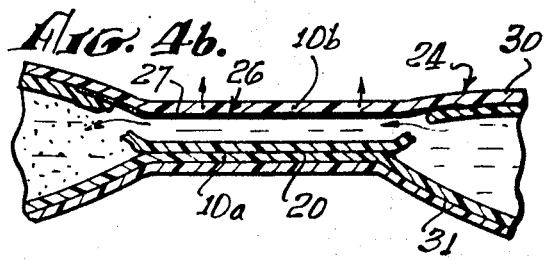
INVENTOR.
BRIAN R. PIKE,
By Knight & Rodgers
ATTORNEYS

MULTIPLE COMPARTMENT PACKAGE

BACKGROUND OF THE INVENTION

The present invention relates generally to containers and packages made from thin, flexible sheet materials; and the invention is more particularly concerned with packages of the type which initially are divided into two or more compartments separated from each other but which can be placed in free communication with one another for transfer of products between different compartments, without rupturing the outer walls of the package, thereby permitting intermingling and mixing of the contents of two adjoining compartments within the package.

Known packages of this type typically have two compartments disposed one at either side of rupturable means separating the compartments from each other. Such packages are designed to hold two different substances, one substance in each of two compartments, isolated from each other in such a way that the substances can be stored without any intermingling of them until needed. The substances in the package may be in the form of a dry material in granular or powder form, or a liquid. A typical situation is a package having a dry material in one compartment which is to be mixed with a liquid in the other compartment. By breaking the barrier between the two compartments while maintaining the exterior walls of the package intact, the two substances in the two different compartments can be transferred from one compartment to the other to be mixed together within the interior space of the container. The mixture may then be discharged from the package or retained within the package, as when the package itself becomes a hot or cold pack.

A container of this general character requires that the outer walls be flexible and strong, so that the walls can be deformed as necessary to force the contents from one compartment to the other and back again to the extent necessary to effect mixing of the ingredients. Containers for this type of use have usually provided barrier means within the package able to effect complete separation of the two compartments until mixing is desired, but which can then be broken at will. Typically, the barrier means has been a separate member of some type inserted between the outer walls of the package and sealed to them. This barrier member is broken by forces applied to it. These forces may be applied to the barrier directly, as by pulling apart the walls of the package at the barrier; or indirectly as by squeezing the compartment containing the liquid to apply sufficient force to the barrier to rupture it.

While various designs of multiple compartment packages for this general purpose have been evolved, one of the most prevalent problems encountered has been to obtain an accurately controlled, repeatable breaking strength of the barrier means separating the compartments. This is particularly true when the package is made from any of the large number of thin flexible films heat-sealable on the inner face and the carrier between the two compartments has been formed by effecting a heat seal between the two outer walls. Because the strength of this heat seal is subject to wide variation in strength from a large number of different causes, it has been found very difficult to produce a heat seal that provides a barrier of uniform breaking strength.

This problem has led to packages having a breaker strip introduced into the package as a third member, between the two walls, and then it is the breaker strip that ruptures. New problems of extra cost of the package because of the breaker strip and of complicated machine design to handle the breaker strip, then arise.

In other designs of packages, there is provided an interior wall or membrane of substantial area separating the two compartments. A wall of this character is often subject to premature failure as a result of flexing fatigue occurring in positions of maximum curvature. When the area of the wall is great enough that movement of the contents of the package, particularly liquid contents, causes repeated movement of the wall with bending or flexing at points of relatively sharp curvature, the barrier is often prematurely broken.

Thus it is a general object of the present invention to provide a package of novel design having means dividing the interior product-holding space between the two outer walls of the package into two separated or isolated compartments, the barrier between the two compartments being rupturable without rupturing the outer walls of the package.

Another object of the invention is to provide a package of this general character that eliminates the need for a breaker strip or similar third element introduced into he package and instead is characterized by simplicity of construction.

A further object of this invention is to provide a multiple compartment package that is of simple construction enabling the package to be made on commercially available machines without the need for expensive changes or modifications.

It is also an object of the invention to provide a package of this general character in which the breaking strength of the barrier between the two compartments can be closely controlled in order to obtain a repeatable breaking strength.

It is also an object of the present invention to provide a package of this general character having internal means separating two compartments, that is not subject to flexure in order to avoid failure from this cause.

It is a further object of the present invention to provide a package of this general character in which the barrier means between two compartments can be ruptured by the application of external pressure to the sidewalls of one compartment, thereby placing the barrier means in tension.

SUMMARY OF THE INVENTION

The present invention is characterized by a multiple compartment package for holding substances in separate compartments, that comprises a pair of overlying walls of thin flexible sheet material joined together to define between the walls an interior product-holding space, each of said walls having a plurality of layers bonded together and at least one wall having a release area in which the bond between the inner layer and the next adjoining layer is reduced in strength. Means are provide for dividing the interior product-holding space into at least two separate compartments, said dividing means comprising a seal joining together said overlying walls and extending transversely across the package and crossing the release area. A product is placed in each compartment; and the products can be transferred between the two compartments by rupture of the inner layer of one of said overlying walls at the release area, thereby providing free communication between the two compartments.

In a preferred embodiment, the overlying walls each have an inner layer which is heat-sealable and consequently the transverse seal is formed by the application of heat and pressure to the package walls. In length the seal crosses the package and in width the transverse seal is less than the corresponding dimension of the release area so that the heat-sealable layer can be ruptured at both sides of the transverse seal to establish communication between the two separate compartments.

It is also preferred to shape the transverse seal in such a manner that it includes stress-concentrating means for facilitating initial rupture of the inner layer in tension when external pressure is applied to one of the compartments in a manner to develop tensile forces in the innermost layer of the outer walls.

DESCRIPTION OF THE DRAWING

How the above, as well as other objects and advantages of the present invention, are achieved will be more readily understood by reference to the following description and to the annexed drawing, in which:

FIG. 1 is a plan view of a filled package constituting a preferred form of the present invention.

FIG. 2 is a longitudinal median section on line 2—2 of FIG. 1.

FIG. 3 is a transverse median section on line 3—3 of FIG. 1.

FIG. 4a is an enlarged fragment of FIG. 2 at the area of the transverse seal separating the two compartments before rupture.

FIG. 4b is a view similar to FIG. 4a after the inner layer has been broken to place the two separated compartments in communication with each other.

FIG. 5 is a fragmentary plan view of a length of the web from which the package in FIG. 1 has been made.

DESCRIPTION OF A PREFERRED EMBODIMENT

The present invention will be most readily understood from a description of the method involved in making a container or the completed filled package; and, consequently, there now follows a description of the material used and the sequence of operations resulting in the formation of a package as illustrated in FIG. 1.

The package illustrated in FIG. 1 as a presently preferred embodiment of the invention comprises two overlying laminated walls 30 and 31 of similar size and shape defining between them an interior space. This space is divided by a central transverse seal into two compartments, each holding a different substance. The seal crosses the release area 26; and by breaking the inner layer of one wall within the release area and at both sides of the transverse seal, the two compartments are placed in free communication with each other.

The web stock from which the walls of the package in FIG. 1 are made is a thin flexible sheet material. Broadly speaking, any suitable laminated material having two or more layers bonded together may be used, although for production reasons it is preferred to use a sheet material which is heat-sealable on one side. Typical of such webs are films of synthetic plastics, such as cellulose acetate or polyester, known as "Cellophane" and "Mylar," respectively, which are coated on one face with polyethylene, such coating or layer typically having a thickness of perhaps 1–3 mil. The "Cellophane" or "Mylar" provides an outer layer of relatively higher unit tensile strength but without thermoplastic properties. The polyethylene of the inner layer is a thermoplastic material which permits two overlying walls to be sealed together by the application of heat and pressure. Other materials for the inner sealing layer are various thermoplastic materials, such as vinyl or rubber-hydrochloride. It is also possible to use a laminated material which is not heat-sealing on one face, the seals referred to hereinafter being made with an applied adhesive; but it will be appreciated that most modern production machines are based upon a film which is heat-sealing on one side and consequently such web stock is preferred.

It is also preferred to make the package from a single sheet of stock; but the invention is not necessarily so limited, as will become apparent later.

Figure 6:
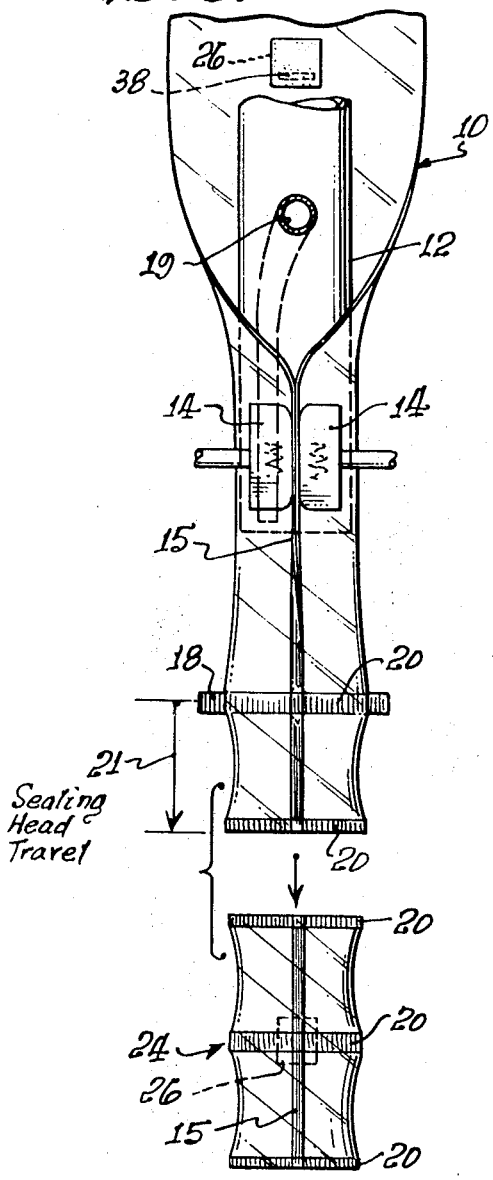
FIG. 6 is a diagrammatic elevation of apparatus for forming and sealing the packages, illustrating the various steps in the completion of the filled package.

According to the presently preferred method, a continuous web 10 of thin, flexible sheet material is drawn around a hollow mandrel 12, as shown in FIG. 6, in order to shape the leading end of the web into a tubular configuration. As the web is drawn downwardly over the mandrel, marginal areas adjoining the two opposite longitudinal edges of the web are brought together in inside-face-to-inside-face relation, and are sealed together by the application of heat and pressure by a pair of opposed sealing heads 14 that reciprocate toward and away from each other. These two sealing heads form a longitudinally extending seam 15, which, as shown in FIGS. 1 and 3, extends for the full length of the package.

By virtue of the seal 15, the web has now become a tube wrapped around the lower portion of mandrel 12. The lower or leading end of this web tube is closed by another pair of heat-sealing heads 18 located below the lower end of the mandrel and which also reciprocate toward and away from each other.

As the two sealing heads 18 come together, they flatten the web tube and bring opposing positions of the inner heat-sealable face of the web together to form a transverse seal 20 extending entirely across the package. This transverse seal 20 closes the lower end of the tube, making the tube ready for receiving a charge of one of the products. These transverse seals 20 are repeated at intervals, and after each seal is placed, one of the products is introduced into the lower end of the tube and above the last seal 20. Each product is fed through one of the two product channels in the hollow mandrel 12. The hollow interior of mandrel 12 may be one such channel while a tube 19 may be located inside the mandrel for the other channel.

As typical of means for advancing the film web downwardly with respect to mandrel 12, sealing heads 18 may be moved vertically downwardly while they grip the web, the range of each vertical movement being the length of one of the product-containing compartments, as shown at 21 in FIG. 6.

One or more shearing blades 22 are located along the patch of the web below the mandrel. These blades 22 (FIG. 7) are actuated by cylinders 23 to sever from the following web a completed package 24. Since the completed package as shown in FIGS. 1 and 6 has two product-containing compartments separated by transverse seal 20, shear blades 22 are actuated to cut the web at alternate seals 20. Thus seals 20 where packages are severed become end seals while the intervening seal 20 on a package is centrally located and separates the two compartments.

FIG. 5 illustrates a plan view of a fragment of the web in its initial flat condition. Web 10 has at regularly spaced intervals a localized or limited release area 26 typically formed by a release coating 27 shown in FIGS. 4a and 4b. This coating may be any substance that operates to reduce the bond between the inner thermoplastic layer 10a and the outer layer 10b of the flexible web stock. In the case of polyethylene extruded onto a "Mylar" base, this release coating can be a graphite base ink, a silicone compound, grease, or any other chemical that reduces to a suitable degree the bond between the two layers 10a and 10b.

It is not necessary that the bond between layer 10a and the release coating 27 be reduced to a zero value, although a very low bond strength is obviously desirable. While no sharp line of relative bond strengths can be or need be established, it is felt that for reliable operation, the bond strength between the layer 10a and release coating 26 should be less than one-half the strength of the bond elsewhere between layers 10a and 10b.

As shown in FIG. 5, the release areas 26 are preferably centered between the longitudinal edges of web 10, for reasons that will be further explained, and successive areas 26 are spaced along the web at intervals determined by the package length. Alternate transverse seals 20 are central of each package and are located to extend transversely across areas 26, as shown in FIG. 1.

The result of the operation as above described is to produce a multiple compartment package 24 for holding separate substances in separate compartments. The finished package now comprises a pair of overlying walls 30 and 31 which are joined together, either by end seals 20 or integrally along fold lines 32 of the web, to define between the two walls an interior product-holding space. This interior product-holding space is divided into two separate compartments. Typically, but not necessarily, one compartment will be filled with a liquid and the other one with a dry powder, as indicated in FIG. 2. The means dividing the package interior comprises a transversely extending seal 20 joining together the two walls 30 and 31, the seal 20 extending transversely across the package and crossing the release area 26. In the embodiment illustrated, the longer dimension of seal 20 extends beyond the limits of release area 26; but it may be desired to enlarge area 26 to the full width of the package to obtain maximum size of opening between compartments. In its width or narrower dimension, seal 20 is of lesser width than the corresponding dimension of release area 26, as shown in FIG. 1.

It is contemplated that the barrier between the two product-containing compartments will be broken by external pressure applied to the liquid-containing compartment, that is to the right-hand compartment in FIG. 2. The external pressure applied to the liquid causes the two walls 30 and 31 to be spread apart adjacent the central seal 20, thereby placing the inner layer 10a of wall 30 in tension. The spreading force is resisted at wall 31 by the full strength of layers 10a and 10b because the bond between them; but in wall 30, tension ultimately occurs only in inner layer 10a because of the low value of the bond between layer 10a and release coating 27. Consequently, the bond yields and the outer layer 10b then no longer supports inner layer 10a, with the result that the inner layer ruptures adjacent central seal 20, as shown in FIG. 4b. Obviously the breaking point depends on both the bond with release coating 27 and the strength of the inner layer and the bond is maintained low enough that it fails under stress, as described. Likewise the tensile strength of this inner layer is less than the strength of the bond between the two layers 10a in the area of central seal 20.

This spreading force strips the layer 10a from release coating 26 and allows liquid to pass out of the right-hand compartment toward the left-hand compartment. This same liquid then applies tension forces to the layer 10a at the entrance to the second compartment, rupturing it at the left-hand side of the central seal 20, as shown in FIG. 4b, to establish free communication between the two compartments. The two products may now be transferred between the two compartments for mixing, after which the package can remain unopened or it may be opened in any suitable manner and the mixture discharged from the package, according to the nature of the contents.

Although the presence of a liquid facilitates rupture of the barrier in the described manner, the seal can be broken if a gas is present since the action is the same.

Figure 8:
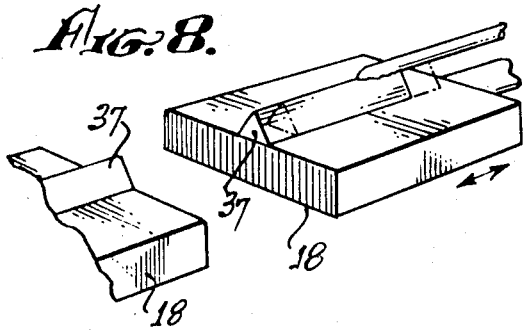
FIG. 8 is a diagrammatic view illustrating the sealing heads for placing the transverse seal on the package when made from film having a heat sealable inner layer.

In order to facilitate initial rupture of the inner layer 10a it is preferred to provide stress-concentrating means adjacent central seal 20 at the side to be first ruptured. This stress-concentrating means may take various forms, typical of which is the triangular sealed area 36. This sealed area is placed adjacent the main transverse seal 20 by a pair of small, triangularly shaped sealing heads 37 located at one side of main sealing heads 18 (FIG. 8). Sealing heads 37 are advanced only at alternate seals. Sealing heads 37 develop a sealed area of pointed configuration that localizes or concentrates maximum tensile stresses centrally of the release area.

It has been found desirable for various reasons to provide a zone of weakness in inner layer 10a at the side of the second break. This zone of weakness is shown by the narrow elongated rectangle 38 in FIG. 1. This zone of weakness is provided to insure that the inner layer 10a ruptures instead of being stripped off outer layer 10b of the package wall by the spreading force that is now exerted between the inner and outer layer of wall 30. In turn, this assurance permits a thicker layer of the thermoplastic material to be utilized which is an advantage in strengthening transverse seals 20 and longitudinal seal 15, without in any way decreasing the ability of the inner layer to rupture initially at the proper location to break the barrier between the two compartments. For example, if a relative thick and strong inner layer of 2-3 mil of polyethylene is thinned at the zone of weakness 38 to approximately 0.5 mil in thickness, or to any other desired degree, the strength of the seals can be increased without reducing the capability of the inner layer to rupture at the proper location.

This thinned area 38 is preferably formed while the web 10 is flat and before it is wrapped around mandrel 12. The thinning operation can be carried out by a heated die (not shown) of the proper shape being pressed against the inner layer 10a while web 10 is stationary between periods of downward movement.

DESCRIPTION OF VARIATIONAL EMBODIMENTS

A number of variations in or departures from the construction of the preferred embodiment described above are possible within the scope of the present invention, some of which will now be mentioned. For example, a second zone of weakness may be formed on the side of the central transverse seal 20 where initial rupture of the inner layer takes place. This results in a package with a zone of weakness on both sides of seal 20; and both zones of weakness can be formed at the same time and in the same manner while web 10 is flat and immediately prior to placing the web around the mandrel 12.

The objectives of a zone of weakness also can be achieved by the initial web if made with two layers of polyethylene. A first layer of uniform thickness is applied and over it the release coating is applied, the result being a web as illustrated in FIGS. 2 and 4a. Then there is applied a second layer of thermoplastic material, preferably thinner than the first. Except at the release coating 27, the two layers of polyethylene bond strongly together and become for all practical purposes a single, integral, strong layer. However, at the release area, the strength of the inner layer is now that of only the second layer of polyethylene which ruptures as described. The advantage is that stronger end seals are possible with the added total thickness of the thermoplastic material.

Figure 9:
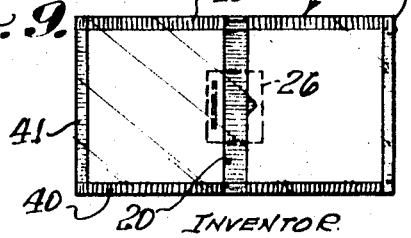
FIG. 9 is a plan view at reduced scale of a package constituting a variational form of the invention.

A package made from a single web or film as shown in FIG. 1 is preferred since release area 26 is then removed by the maximum distance from a longitudinal cut edge and thus maximum security is afforded against failure of the package by delamination, that is by separation of the inner and outer layers 10a and 10b of one wall under the spreading force applied internally. Also, with a single web the release area can be extended transversely of the package as much as desired, up to the full width of the package, without approaching too closely a longitudinal edge. However, it is within the scope of the present invention to make the package from two separate films as indicated in FIG. 9. Here the package 24a is made from two films which are joined together at marginal areas along the longitudinal edges of the films and of the package by said seals 40, as well as by being joined by end seals 41. The central transverse seal 20 is applied and located in the same manner as already described. This package 24a differs from the package 24 only in that longitudinal side seals 40 are present to join the two walls together instead of the two walls being integral along fold lines 32. Also, the longitudinal seam 15 is not present as it is not required.

Figure 7:
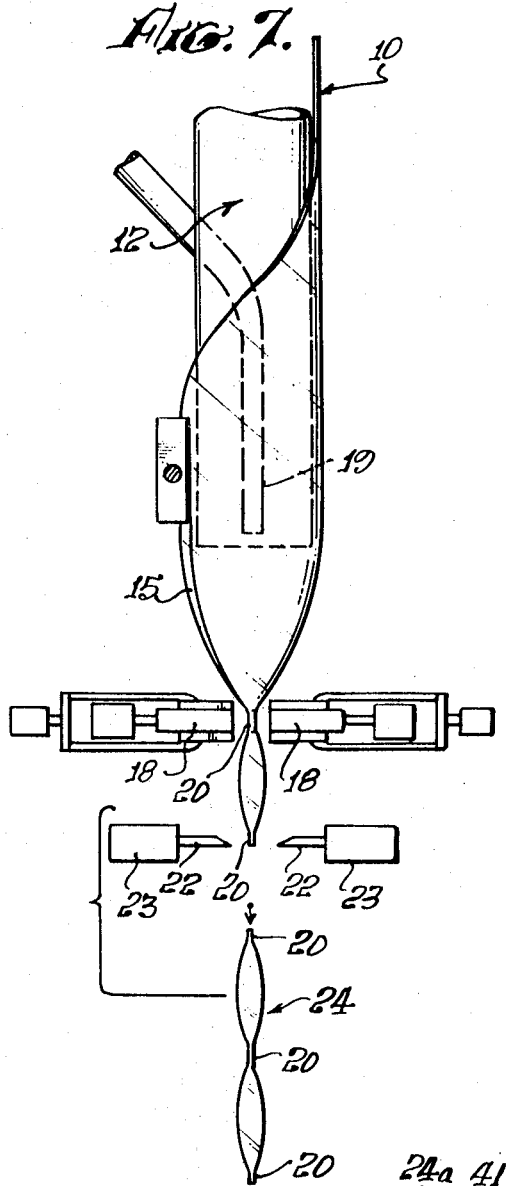
FIG. 7 is a view similar to FIG. 6 but viewed at 90° thereto.

For economic reasons it is obviously advantageous to form, fill, and seal the package in a continuous sequence of operations as illustrated in FIG. 6 and 7. However, it is within the scope of the present invention to produce empty containers which are constructed either in the manner of package 24 or package 24a except that the end seals, 20 and 41, respectively, are omitted at the time the container is made.

In such containers, the central transverse seal is placed across the release area but the products are not inserted into the product-containing compartments. This permits the containers to be manufactured at one point and shipped empty to a user who then fills each of the two product-containing compartments through the open ends and completes the package by placing the end seals. In some situations this procedure may be found to be advantageous.

Another variation of the present invention that will be apparent without specific illustration is the use of the barrier means between the two product-containing compartments as a closure for a package or container having but a single product-containing compartment. In such a case the package would, for example, be the same as that illustrated in FIGS. 1 and 2 except that part or all of the package walls to the left out of the release area 26 would be omitted. The package would terminate substantially along the left-hand longitudinal edge of release area 26 and have a single product in one compartment that is closed at one side by central seal 20.

The present invention is independent of the particular technique or construction utilized to produce release area 26. The above description has been based upon the assumption that inner and outer layers 10a and 10b of the web bond together and accordingly a positive member 27 is required to reduce this bond in the release area. On the other hand, some types of laminated films require the presence of an adhesive between the inner and outer layers. Under these latter circumstances, it will be readily obvious from the foregoing description that the release area 26 can be very satisfactorily obtained by making an area on one of the layers so that over the masked area no adhesive is applied between the layers 10a and 10b. Thus the release area 26 is then provided by the absence of an adhesive and the printed release coating 27 is omitted as unnecessary.

From the foregoing description it will be apparent that various other changes may be made in the construction of a package or a container within the scope of the present invention, and accordingly the foregoing description is not to be construed as being limitative upon, but rather illustrative of the invention disclosed herein.

I claim:

1. A multiple compartment package for holding substances in separate compartments, comprising;
    a pair of overlying walls of thin flexible sheet material joined together to define between the walls an interior product-holding space, each of said walls having a plurality of layers bonded together and at least one wall having a release area at which the bond between adjoining layers is reduced in strength;
    means dividing the interior product-holding space into two separate compartments, said means comprising a seal joining together said walls and extending transversely across the package and crossing the release area; and
    a product in each compartment;
    whereby product transfer between the two compartments can be established by rupture of the inner layer at said release area.

2. A multiple compartment package according to claim 1 in which the inner layer on each wall is a heat-sealable material and the transverse seal is one formed by heat and pressure.

3. A multiple compartment package according to claim 1 in which the transverse seal extends lengthwise thereof between opposite sides of the package and beyond the release area, and the width of the transverse seal is less than the corresponding dimension of the release area.

4. A multiple compartment package according to claim 1 which includes stress-concentrating means adjacent the transverse seal for facilitating rupture of the inner layer when same is in tension.

5. A multiple compartment package according to claim 1 in which the transverse seal is formed by a strip of adhesive applied to one wall.

6. A multiple compartment package according to claim 1 in which a said adjoining layer has printed on it over the release area a substance reducing the bond between the adjoining layers.

7. A multiple compartment package according to claim 1 which also includes a zone of weakness in the inner layer of said one wall within the release area.

8. A multiple compartment package according to claim 7 in which the zone of weakness is a thinned area in said inner layer.

9. A multiple compartment package according to claim 1 in which said one wall comprises:
    an outside layer of a relatively high-tensile strength material lacking thermoplastic properties;
    a first layer of a thermoplastic material of uniform thickness applied to one face of the outside layer;
    a coating of a release material applied to said first layer over a limited area, said material reducing the bond between it and the next mentioned layer; and
    an inner layer of a thermoplastic material applied to the first layer over the release material and strongly bonded to the first thermoplastic layer except at said coating to form the release area.

10. A multiple compartment package according to claim 1 in which the package comprises a single sheet of material with opposite marginal edges joined together in a longitudinal seam disposed centrally of one of said pair of walls of the package and the release area is on the other of said pairs of walls opposite the longitudinal seam.

11. A multiple compartment package according to claim 10 in which the ends of the package are each closed by a transverse seal generally parallel to the seal between compartments.

12. A multiple compartment container for holding substances in separate compartments, comprising:
    a pair of overlying walls of thin flexible sheet material joined together, except for product-receiving openings, to define between the walls an interior product-holding space, each of said walls having a plurality of layers bonded together and at least one wall having a release area at which the bond between adjoining layers is reduced in strength; and
    means dividing the interior product-holding space into two separate compartments, each having a product-receiving opening, said means comprising a seal joining together said walls and extending transversely across the package and crossing the release area;
    whereby the means dividing the interior space into two compartments can be ruptured by rupture of the inner layer at said release area.

13. A multiple compartment container according to claim 12 in which the inner layer on each wall is a heat-sealable material and the transverse seal is formed by heat and pressure.

14. A multiple compartment container according to claim 12 in which the transverse seal extends lengthwise thereof between opposite sides of the container and beyond the release area, and the width of the transverse seal is less than the corresponding dimension of the release area.

15. A multiple compartment container according to claim 12 in which a said adjoining layer has printed on it over the release area a substance reducing the bond between the adjoining layers.

16. A package for holding a product, comprising:
    a pair of overlying walls of thin flexible sheet material joined together to define between the walls an interior product-holding space, each of said walls having a plurality of layers bonded together and at least one wall having a release area at which the bond between adjoining layers is reduced in strength;
    means closing the interior product-holding space at one side thereof, said means comprising a seal joining together said walls and extending transversely across the package and crossing the release area; and
    a product in said interior space;
    whereby an opening for product discharge from the package can be established by rupture of the inner layer at said release area.

17. A package according to claim 16 in which the inner layer on each wall is a heat-sealable material and the transverse seal is formed by heat and pressure.

18. A package according to claim 16 in which the transverse seal extends lengthwise thereof between opposite sides of the package and beyond the release area, and the width of the transverse seal is less than the corresponding dimension of the release area.

19. A package according to claim 16 in which a said adjoining layer has printed on it over the release area a substance reducing the bond between the adjoining layers.